United States Patent [19]

Waring, Jr.

[11] 3,736,385

[45] May 29, 1973

[54] STORAGE AND RETRIEVAL OF ANALOG INFORMATION WITH MAGNETOOPTIC READOUT

[75] Inventor: Robert K. Waring, Jr., Wilmington, Del.

[73] Assignee: E. I. du Pont de Nemours and Company, Wilmington, Del.

[22] Filed: June 1, 1971

[21] Appl. No.: 148,703

[52] U.S. Cl. ................179/100.2 CH, 340/174 YC, 340/174.1 M, 350/151

[51] Int. Cl. ..........................G11b 11/10, G11b 5/02

[58] Field of Search ............................179/100.2 CR; 340/174.1 M, 174 YC; 350/151

[56] References Cited

UNITED STATES PATENTS

| | | | |
|---|---|---|---|
| 3,513,457 | 5/1970 | Nelson | 340/174.1 M |
| 3,562,760 | 2/1971 | Cushner et al. | 179/100.2 CR |
| 3,592,964 | 7/1971 | Waring | 340/174.1 M |

OTHER PUBLICATIONS

"Display System," Hudson, RCA Tech. Notes, TN. No. 844, 7/69.

*Primary Examiner*—Bernard Konick
*Assistant Examiner*—Robert S. Tupper
*Attorney*—D. R. J. Boyd

[57] ABSTRACT

A method is disclosed for the storage and retrieval of analog information by magnetic recording of the information as a modulated carrier frequency on magnetic recording member such as magnetic tape followed by magneto-optic read out. The signal field from the tape is combined with a bias field constant with time and directed at an angle to the signal field from the tape so that a resultant field is produced for application to the magneto-optic surface which varies angularly with the intensity of the signal field. The direction of magnetization of elements of the magneto-optic film can be varied transiently by the signal and bias field, or, with suitable framing techniques storage type transfer to suitable magneto-optic surfaces can be accomplished. Read-out of the pattern of magnetization on the magneto-optic surface with polarized light effects full wave rectification of the carrier frequency and recovery of the analog information.

11 Claims, 10 Drawing Figures

Patented May 29, 1973

3,736,385

3 Sheets-Sheet 1

INVENTOR
ROBERT K. WARING, JR.

BY

ATTORNEY

INVENTOR
ROBERT K. WARING, JR.

BY D R Boyd

ATTORNEY

INVENTOR
ROBERT K. WARING, JR.

BY

ATTORNEY

STORAGE AND RETRIEVAL OF ANALOG INFORMATION WITH MAGNETOOPTIC READOUT

FIELD OF THE INVENTION

This invention relates to the storage of analog information on magnetic recording members such as magnetic tape and the retrieval of the analog information by magneto-optic methods.

SUMMARY OF THE INVENTION

The analog information is recorded on a suitable magnetic recording member such as a conventional magnetic tape in the form of amplitude modulation of a carrier, preferably of a single spatial frequency greater than the desired resolution spatial frequency of the analog information. The modulated carrier can be recorded as such or can be formed by partial demagnetization of a prerecorded carrier signal.

The analog signal is recovered by adding vectorially the signal field from the recording with a bias magnetic field constant in time and directed at an angle, preferably 90°, to the signal field, so that the direction of the resultant field varies with the amplitude of the carrier from point to point. Next, the resultant field is transferred to a magneto-optic mirror whereby the direction of magnetization of each portion of the mirror is rotated in accordance with the resultant field. The magnetic image on the magneto-optic mirror is read-out by directing a beam of polarized light on the magneto-optic mirror. The areas of differing magnetic orientation, forming the magnetic image, rotate the plane of polarization of light on reflection to differing degrees (the Kerr magneto-optic effect) which can be differentiated by passing the reflected light through an analyzer, preferably set to extinguish reflected light in the absence of a signal field. The light emerging from the analyzer is then detected by an optical image detector which can be the human eye, a photographic plate, or the like, but is preferably a detector with the linear response such as an image orthicon or a plumbicon. The optical image thus obtained corresponds to a full wave rectification of the modulated carrier recorded on the magnetic recording member.

The magnetic field above a recording member bearing a periodic carrier signal is proportional to the spatial frequency and to the amplitude of the signal. Accordingly, it is preferred to employ a carrier of constant spatial frequency whereupon the field adjacent the magnetic recording member will be proportional to the amplitude of the carrier. It is also possible to employ an aperiodic carrier in the practice of this invention, provided that a sufficient number of maxima are present within the desired resolution distance of the image so that the average signal in the resolution distance is proportional to the analog modulating signal, i.e., the spatial frequency representing the desired resolution distance should be preferably less than the minimum spatial frequency of the frequency spectrum of the carrier. Even though the analog information can be two-dimensional, the carrier need be periodic only in one dimension, although carrier signals periodic in two dimensions can also be employed.

Various methods of transfer can be employed depending on the type of magneto-optic film employed. These can be:

i. Non-storage transfer wherein a conventional magnetic film having an anisotropy field greater than the coercivity is employed. The bias field is applied along the easy axis of preferably and is preferbly greater than the anistropy field. The field from the recording member is directed about perpendicular to the bias field, i.e., along the hard axis of magnetization. Preferably, the bias field and the anisotropy field together should be about 10 to 20 percent of the maximum signal field. The signal is transferred in a non-storing manner by the arrangement, the film returning to a fully magnetized condition along the easy axis under the influence of the bias field on removal of the field from the recording member ii. Storing type transfer.

For storing type transfer it is essential that films are employed wherein the anisotropy field is substantially less than the coercivity, i.e., essentially isotropic magneto-optic films. The transfer methods can be further classified according to whether the coercivity of the magneto-optic film is greater or less than the vector sum of the signal and bias fields for all signals to be transferred:

a. when the magneto-optic film has a coercivity exceeding the resultant field of the bias and the maximum signal field, a collapsing rotating magnetic field having a maximum strength exceeding the algebraic sum of the maximum resultant field and the coercivity is employed to effect transfer. This method provides for framing images recorded in sequence on a magnetic tape which is moving continuously past the magneto-optic film provided the duration of the collapsing rotating field is short compared with the time in which the tape moves a resolution distance.

b. when the film is of low coercivity, the image can be transferred by applying the signal and bias fields to the magneto-optic film and then removing the magnetic recording member and bias field simultaneously. This can be achieved by providing a bias field from a magnetic recording of the same uniform spatial frequency as the carrier but at right angles thereto and moving the magnetic bias recording and the magnetic recording member in fixed spatial relationship away from the magneto-optic film, i.e., the bias magnetic recording can be on the surface of a platen over which the magnetic recording member is placed and which can be applied transiently at suitable times to the magneto-optic film.

THE DRAWINGS AND DETAILED DESCRIPTION OF THE INVENTION

This invention will be better understood by reference to the drawings which accompany this specification. In their discussion:

Figure 5A:
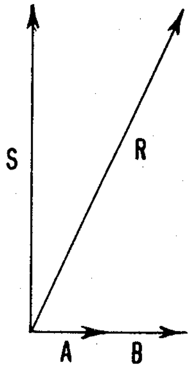
Figure 5B:
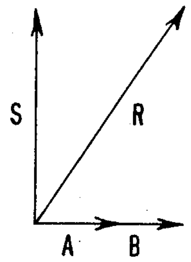
Figure 5C:
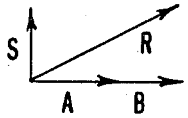

FIGS. 5A, 5B, and 5C are diagrams showing the vector addition of the signal field with the magnetic anisotropy and a bias field.

Figure 6:
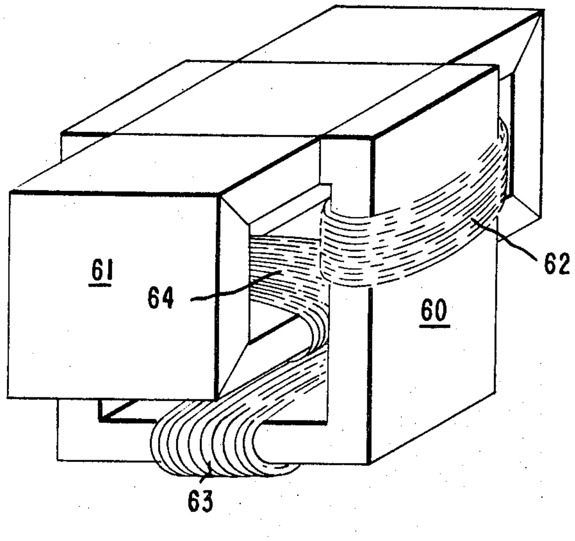

FIG. 6 shows the construction of a magnet for producing a constant bias field and a rotating, decaying, pulsed field for a signal transfer.

Figures 7, 8:
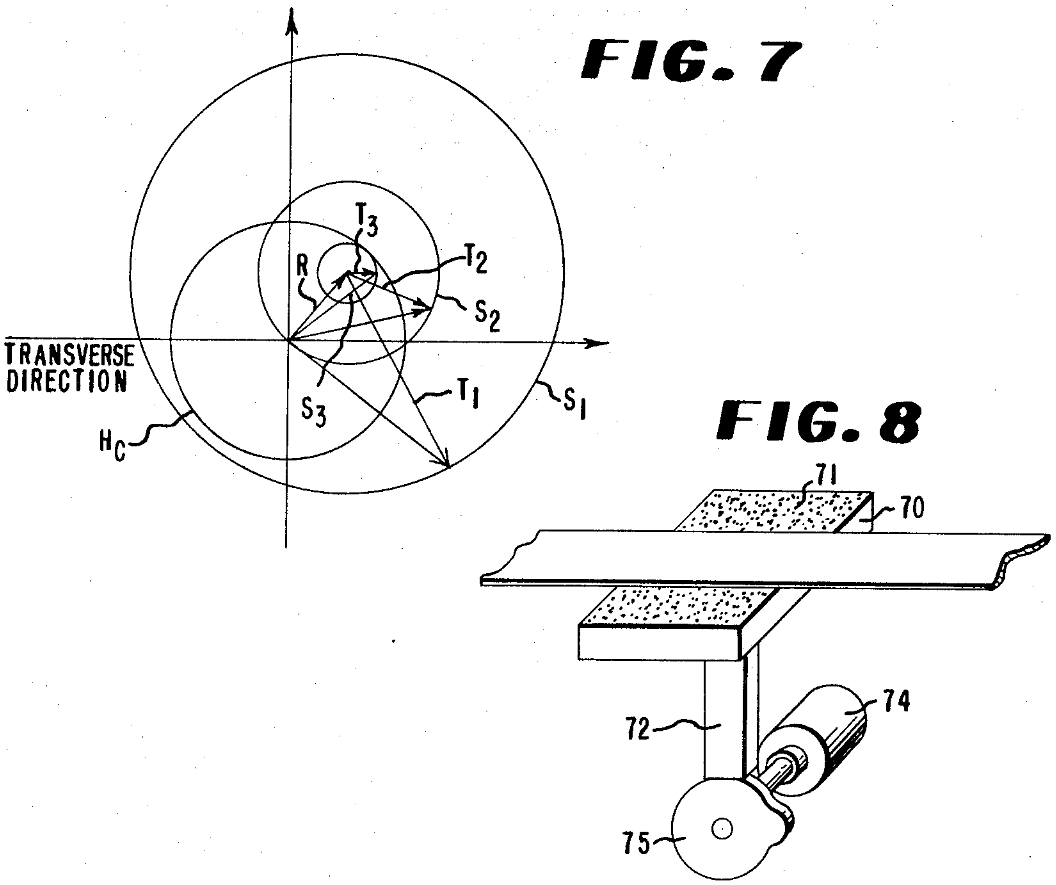

FIG. 7 is a diagram illustrating the process of signal transfer to a hard magneto-optic surface using a collapsing rotating magnetic field.

FIG. 8 illustrates a method of transfer and framing using a periodic bias field, constant in time, with mechanical withdrawal means to accomplish framing.

Figure 1:
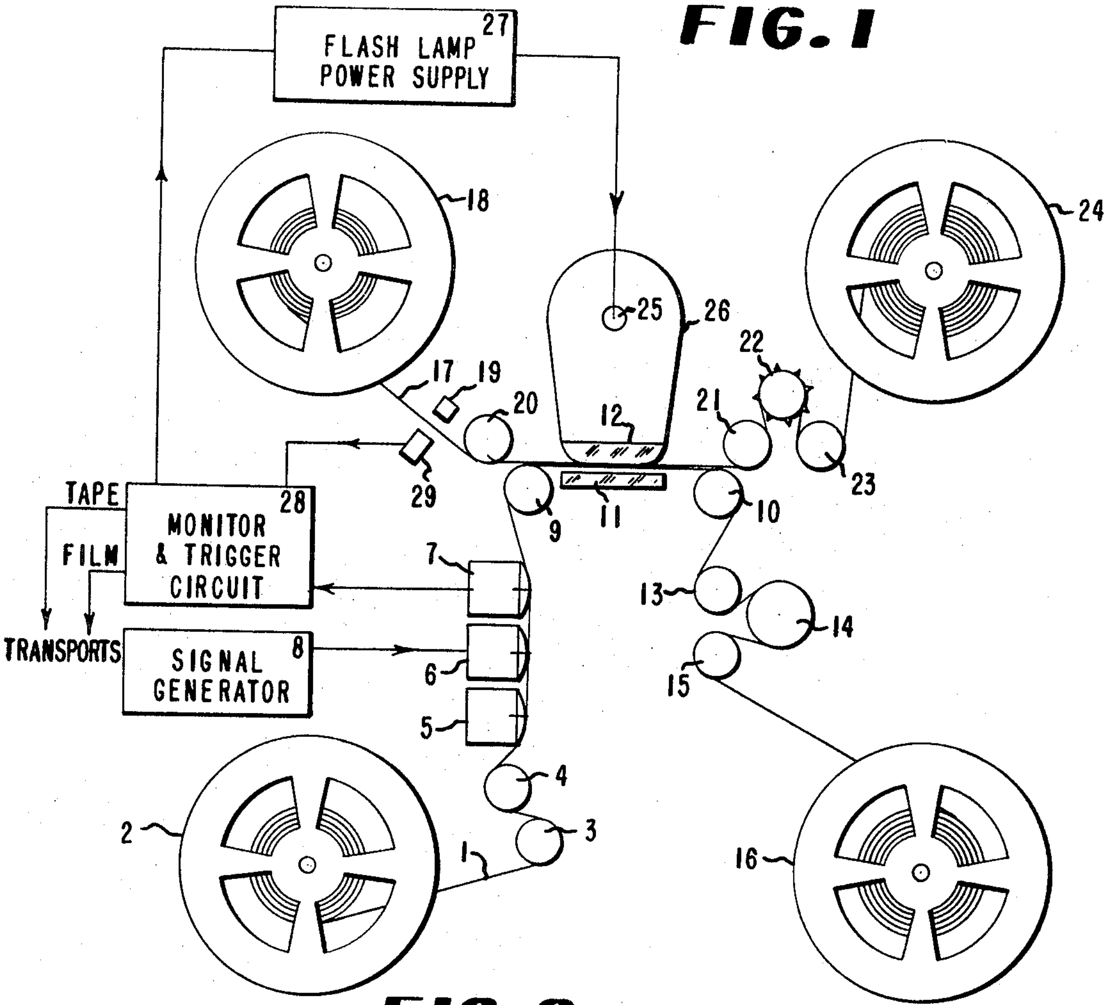
FIG. 1 shows apparatus for premagnetizing a magnetic tape with a carrier frequency and for amplitude modulating the carrier.

Referring to the drawings, FIG. 1 shows a method of magnetically recording a carrier signal on a magnetic tape having as its working material a fine powder of hard magnetic particles of low Curie temperature; and therafter modulating the carrier signal by thermomagnetic demagnetization in accordance with a sequence of images on motion picture film. The magnetic tape, 1, can be conventional magnetic tape having a coating of chromium dioxide or modified chromium dioxide in the form of acicular particles. The tape 1 is stored on reel 2 and is fed over rolls 3 and 4 and thence over three magnetic heads 5, 6 and 7. Head 5 is a conventional erase head which is employed to erase any prior signal. Head 6 is a recording head which records a sine wave carrier signal on the tape 1. A sine wave voltage is supplied to head 6 by a signal generator 8. Head 7 is employed to monitor the signal on the tape. The tape next passes over rolls 9 and 10 between the platen 11 and platen 12 which, for reasons which will become apparent hereinafter must be transparent. The tape then passes through the capstan assembly formed by rolls 13, 14 and 15 and is taken up on reel 16. Reels 2 and 3 are driven by constant torque motors, as is conventional in the magnetic recording art, to maintain the desired tension on the tape.

The sequence of images which are employed to modulate the recorded carrier signal are contained on a strip of photographic movie film 17 which is stored on reel 18. The film passes through an assembly of a lamp 19 and a photoelectric cell 29 which controls the motion of the film either by detection of signals printed on a strip of the film adjacent to the strip of images, or conveniently by detecting the sprocket holes in the film. The film then passes between the platens 11 and 12 being guided by rolls 20 and 21 when it is maintained in face to face contact with the magnetic tape, i.e., the emulsion side of the photographic film 17 is in contact with the magnetic coating of tape. The film is pulled through platens 11 and 12 by the sprocket wheel 22 and then passes over roll 23 to the storage reel 24. Also provided is a xenon flash lamp 25 inside a reflecting hood 26 adapted and arranged to substantially uniformly illuminate the surface of the magnetic tape 1 bearing the hard magnetic working material through the transparent platen 12 and the photographic film 17. The flash lamp is powered by a power supply 27 which is triggered in response to signals from the monitoring and triggering unit, 28, the frequency of the flashes in response to the triggering being determined by the monitoring of the tape movement by head 7 and of the photographic film 17 by the photocell and the lamp assembly 19 and 20. The monitoring unit also supplies feed back signals to the film drive 22 and the tape capstan 14 to maintain the motion picture film and the tape in constant motion and stationary with respect to each other.

In operation, the tape and film are moved synchronously through the platens 11 and 12 so that they are maintained in registration. The flash lamp is activated at intervals so that each portion of tape 1 bearing the prerecorded sine wave is exposed to the flash at least once. The intensity of the flash is regulated so that light passing through the most transparent areas of the photographic film and absorbed by the coating of the tape is sufficient to heat the magnetic coating of the tape to about the Curie temperature, thus substantially completely demagnetizing such areas of the prerecorded carrier signal. Thermal bias can be applied to the tape to enhance the linearity of the demagnetization process by providing for the electrical heating of platen 11. The duration of the flash is desirably extremely short ($< 1$ millisecond) in order to minimize loss of resolution in the thermal image on the tape by thermal diffusion. As indicated, the tape has been premagnetized with a sine wave or other periodic pattern with the magnetic moment of each portion oriented in the positive or negative sense along the direction of tape travel. Thermomagnetic demagnetization can, however, be employed to demagnetize the carrier signal in an analog manner either along the tape direction or transversely thereto or both simultaneously.

Figure 2:
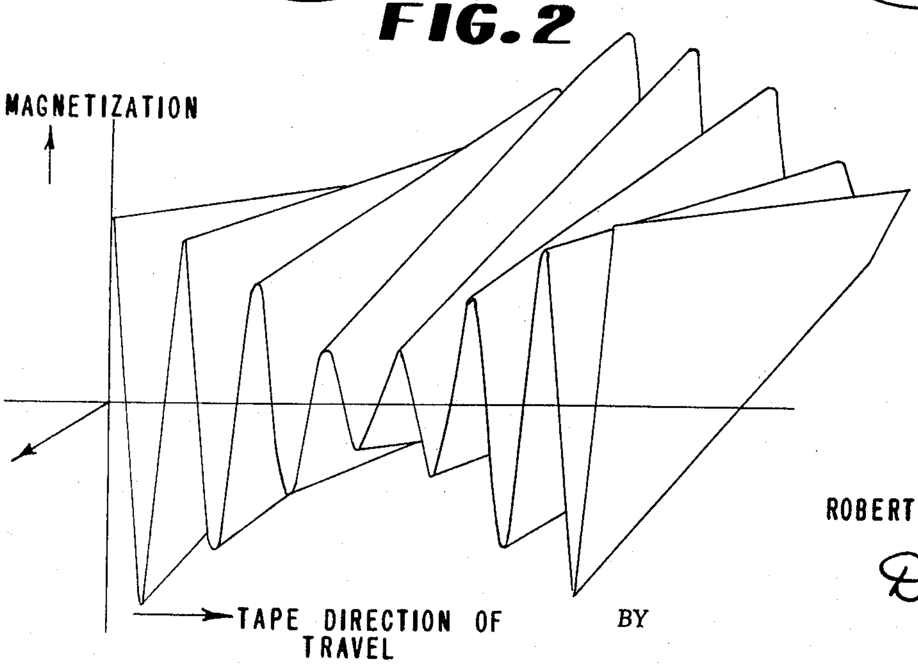
FIG. 2 is a diagram to illustrate the modulation of the periodic magnetic carrier signal employed in the process of this invention.

FIG. 2 is a sketch illustrating a magnetized carrier which has been amplitude modulated as described above.

Figure 3:
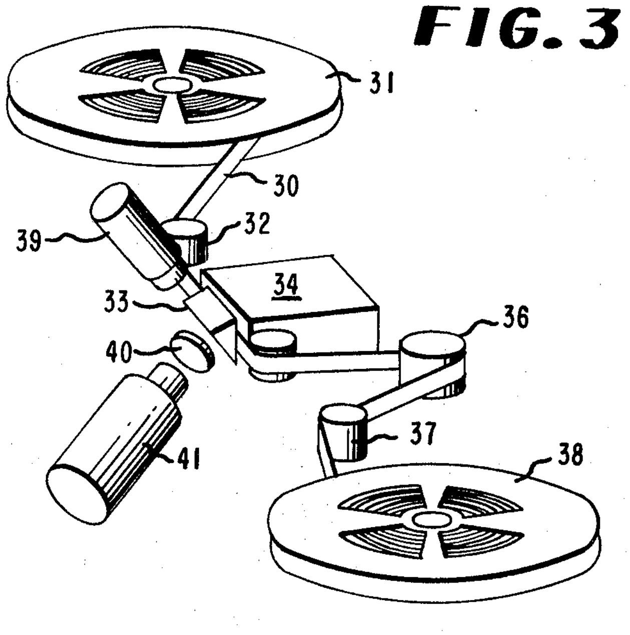
FIG. 3 is a sketch of apparatus employed in reading out analog signals modulating a magnetic carrier using a magneto-optic surface.

FIG. 3 shows apparatus for recovering the analog information in demodulated form from an amplitude modulated carrier signal as described in FIGS. 1 and 2. The tape, 30, containing the modulated carrier recorded thereon is stored on reel 31 and passes over roll 32 to the magneto-optic read-out station consisting of a prism 33 having a magneto-optic film deposited on the face thereof adjacent the magnetic working layer of the tape. Behind the tape is a device represented by the box 34 to supply bias and framing motion or fields as will be described more particularly in connection with specific embodiments of this invention. The tape then passes over roll 35 to capstan 36 and thence over roll 37 to the take-up reel 38. A source of polarized light 39 directs a beam of polarized light on the magneto-optic film through one face of the prism 33. The light reflected from the magneto-optic film passes through an analyzer 40 and is imaged on an orthicon, a plumbicon or similar light detecting device 41, preferably of the linear type.

The present invention employs a modulation in the intensity of magnetization of a sinusoidal carrier recorded on a magnetic recording member as a method of storing information. This storage system has the advantage that a prerecorded carrier can be demagnetized by thermal methods which directly reduce the level of magnetization in accordance with the analog information. A further important advantage is that the magnetic field external to the magnetic recording member likewise varies sinusoidally and is proportional, at a fixed distance to the recording member, to the amplitude of the carrier. Thereby, the usual problem with magnetic recording, i.e., the surface field that conveys information to the detector bears no one-to-one relationship to the magnetization distribution containing the information, is alleviated.

In the embodiments of this invention, the magnetic signal field generated by the amplitude modulated carrier is added vertorially to a constant bias field at an angle, preferably at a right angle, to the signal field. The resultant field, which is the vector sum of the bias field and the signal field, will, therefore, be at an angle to the direction of the signal field which depends on the amplitude of the signal field. Thus when the signal field is zero, the resultant field will be in the direction of the bias field. When the signal field is very much greater than the bias field, the resultant field will be directed approximately in the direction of the signal field. Thereby, the information is contained in the angle of the net field and a means is required to detect said angle.

Said angle detection can be achieved by applying the resultant field to a magneto-optic surface to locally rotate the direction of magnetization. The rotation of the direction of magnetization changes the Kerr rotation of polarized light to a degree which increases with the rotation but is insensitive to sense of rotation of the magnetic vector. If polarized light reflected from the magneto-optic surface is passed through an analyzer set to extinguish light reflected from the magneto-optic film when the direction of magnetization is in the direction of the bias field, the rotation of the magnetization vector will cause light to be transmitted through the system. The amount of light transmitted is approximately proportional to the amplitude of the carrier, regardless of the sense of the magnetization which reverses for each successive half cycle. The method of read-out therefore accomplishes a full wave rectification of the carrier signal thereby recovering the original analog signal. This method gives brightest output where the carrier has been exposed to the least light in the thermal demagnetization step. Therefore it is desirable to use a negative in such a step so that read-out from the back of the film (as shown in FIG. 3) gives a positive right reading image.

The method for magnetizing the magneto-optic surface in accordance with the resultant of the bias and signal fields depends on the type of magneto-optic surface, and whether or not it is desired to store the image between successive transfers.

In all the embodiments it is to be noted that the degree of rotation of the light is small. For this reason, it is highly desirable to enhance the Kerr rotation of the magneto-optic surface by optical matching techniques which are known to those skilled in the art. Likewise, it is desirable to employ highly efficient polarizers and analyzers such as Glan-Thomsen prisms. Ellipticity of the reflected light should also be corrected, either by appropriate optical matching techniques for the magneto-optic film or by the use of a compensating device such as a Babinet compensator: A. S. Hoffman, et al., J. Appl. Phys., 41, 1407 (1970), "Enhancement of the Longitudinal Kerr Magneto-Optic Effect in Thin Films."

NON-STORING READ-OUT

Non-storing read-out can be achieved with anisotropic magneto-optic films of low coercivity. Such films are characterized by a "hard" and an "easy" axis of magnetization in the plane of the film which are perpendicular to each other, and by an anisotropy field which is greater than the coercivity. In this embodiment of the invention, the bias field is applied along the easy axis of magnetization where it cooperates with the anisotropy field. Preferably the bias field should exceed the anisotropy field (and therefore the coercivity) so that the magneto-optic film is magnetized uniformly along the easy axis in the absence of a signal field.

The field strength adjacent to a magnetic tape bearing a carrier frequency recorded thereon will depend on the degree of magnetization on the linear wavelength of the carrier and on the magnetic material of the tape. Typical fields for conventional magnetic tapes wherein the peak amplitude of the carrier signal approaches saturation are in the order of 100 Oe. Desirably, the bias field plus the complementary anisotropy field will be about 10 to 20 percent of the maximum amplitude of the modulated carrier field.

Figure 4:
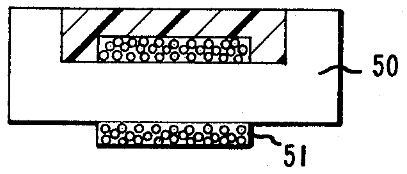
FIG. 4 is a diagram to illustrate a magnet suitable for producing a constant bias field.

In this embodiment, the transfer device 34 of FIG. 3 can be a pair of permanent magnets arranged to direct a substantially uniform field across the surface of the tape bearing the magnetic coating which is directed perpendicular to the direction of tape travel. Alternatively, a simple electromagnet such as that shown in FIG. 4 may be employed in which a flat U-shaped core of a soft magnetic material is wound with a coil 51 in which a D.C. electric current flows which is adjusted to supply the desired field. The center of the U is filled with a plastic resin. It is preferable, however, for the tape to slide on the prism surface and to be slightly separated from the magnet face.

FIGS. *5a*, *5b* and *5c* illustrate the manner in which the constant bias field, B, cooperates with the anisotropy, A, and the signal field, S, derived from the tape to form a resultant magnetic vector, R, which lies at an angle to the signal field determined by the strength of the signal field.

STORING TYPE TRANSFER

Magneto-optic surfaces can also be prepared which are essentially isotropic, i.e., the coercivity is substantially independent of direction and which have a relatively high coercivity. Thus, British Pat. No. 1,104,709 describes the preparation of isotropic ferromagnetic films by vacuum deposition of a film of ferromagnetic metal on a substrate, cooling the deposited metal to ambient temperature in an oxidizing atmosphere from at least 150°C., and thereafter depositing a second ferromagnetic layer on the first layer by vacuous deposition at an angle of incidence greater than 45°. Using this technique iron films can be deposited which have a thickness of about 140 A (suitable for optical matching techniques) which are magnetically isotropic, and which have a coercivity of about 164 Oe., i.e., greater than the resultant fields most commonly employed in the practice of this invention.

Using a film of this character for the magneto-optic surface it is possible to obtain storing type transfer by application of a decaying rotating transfer magnetic field having a maximum amplitude greater than the algebraic sum of the amplitude of the resultant of the signal and bias fields and the coercivity of the film, but less than the coercivity of the record member material.

A constant bias magnetic field and a rotating, decaying transfer magnetic field can be applied using a magnet assembly such as that shown in FIG. 6. In FIG. 6, two U-shaped soft magnetic cores 60, 61 are crossed, core 60 is provided with a winding of electrical wire 62 and a second winding (not shown in the figures) symmetrically arranged through which d.c. current is passed to provide a bias field. Another winding 63 is also provided on core 60 for applying the transfer field. Core 61 is supplied with a winding 64 for applying the transfer field. A decaying oscillating pulse is applied to winding 63 and is applied in quadrature to winding 64 to produce the rotating, decaying magnetic field. The central gap between the areas of the U magnets is preferably filled with a nonmagnetic material to provide a smooth surface on which the tape slides. It is preferable, however, for the tape to slide on the prism surface and to be slightly separated from the magnet face.

FIG. 7 illustrates the mechanism by which the resultant of the bias field and the signal field is transferred to a magnetically hard, isotropic magnetooptic surface with the aid of a decaying rotating magnetic bias field.

In FIG. 7 the magnetic field is plotted so that the radius from the origin represents intensity and the azimuth represents direction. In the figure the resultant of the signal and bias fields is indicated by R. The coercivity is essentially constant in all directions and must be greater than R. In the diagram, the coercivity is indicated by the circle $H_c$ centered on the origin. The rotating, decaying transfer magnetic field adds vectorially to R and is therefore a spiral centered at the end of R away from the origin. For simplicity, the transfer field is represented by three concentric circles of radius $T_1$, $T_2$ and $T_3$ centered on the end of R in FIG. 7. In the case of $T_1$, the resultant field will be a vector whose tip rotates on the circle as indicated by $S_1$, $T_1$ is such that $T_i - R > H_c$ so that the field at all points in time exceeds the coercivity of the magneto-optic film: the direction of magnetization of the film will thus rotate as $S_1$ rotates. When the transfer field is decreased to $T_2$, the resultant of R and $T_2$ likewise travels in a circle $S_2$. The direction of magnetization of the magneto-optic surface will oscillate over the angle formed by the intersection of the path of $S_2$ with the coercivity circle, $H_c$. When the transfer field decreases to the point at which $R + T = H_c$ as shown by the field $T_3$, the magnetization of the magneto-optic film becomes fixed in the direction of R and remains so for all smaller values of T.

Thus the application of a pulsed rotating changing bias field results in the transfer of a pattern of magnetization to the magneto-optic film which is permanent, regardless of changes in R caused by movement of the tape past the magneto-optic surface until a further pulse of changing rotating magnetic field is applied. This metood of transfer, therefor, provides a method of framing successive images recorded on the magnetic tape. For this purpose a second track can be recorded on the magnetic tape to provide framing signals which trigger a pulse of the rotating magnetic field when the tape is in appropriate position with respect to the magneto-optic surface for transfer. Provided the duration of the framing pulse is short compared with the time taken for the tape to move the desired resolution distances, framing can be accomplished although the tape moves continuously past the magneto-optic surface.

The decrement in amplitude between successive cycles of the rotating, decaying magnetic field determines the degree of resolution of differing intensity levels. However, the minimum decrement between cycles which will result in increasing resolution is determined by inhomogeneities in the magneto-optic surface and in the bias field. With careful construction, however, such inhomogeneities can be reduced to a level of about 2 Oe.

Isotropic magneto-optic film of low coercivity can also be produced. Thus E. Fuchs and W. Zinn, J. Appl. Phys. 34 2557 (1963) disclose the manufacture of isotropic Permalloy films by vacuum deposition of an alloy containing 81 percent nickel and 19 percent iron in a 50 cps rotating magnetic field having a strength of about 30 Oe produced by two sets of cross Helmholtz coils, the substrate being heated to 450°C. prior to deposition and maintained at 220°C. during deposition. Coercivities of the order of 1 Oe are obtained.

Such films of low coercivity can be employed for storing type transfer by applying the resultant magnetic field R compounded of the signal field and a time-wise constant bias field directly to the magneto-optic film, and then reducing the signal field and the bias field so that the ratio of the signal/bias field remains constant at each point on the magneto-optic surface. With respect to the signal field, reduction of the field can be accomplished by moving the magnetic tape perpendicularly away from the magneto-optic surface. The simultaneous reduction of the bias field in proportion to the signal field can, in principle, be performed by electrical means, but this is difficult. One method of producing a bias field which decays at the same rate as the signal field is to provide a space-wise sinusoidal bias of constant amplitude having a wavelength the same as that of the carrier sinusoidal magnetization but disposed perpendicular to it. Such bias can be recorded on the surface of a platen by a magnetic recording head, by thermoremanent transfer or otherwise. The tape passes over the platen so that the sinusoidal bias is perpendicular to the recorded carrier wave. The tape and platen are moved by mechanical means perpendicularly to and from the magneto-optic surface so that the platen and tape are in fixed spatial relationship to each other. The magnetic field at a distance, a, above a sinusoidal carrier of wavelength, λ, is proportional to $$\exp\ [-(2\pi a/\lambda)\ ]$$

If the area recorded on the tape is at distance $a_1$ from the magneto-optic film and the distance of the sinusoidal bias is at distance $a_2$ from the magneto-optic surface, the ratio is proportional to $$\exp\ [-(2\pi/\lambda)\ (a_1 - a_2)]$$

which is a constant provided $a_1 - a_2$ (i.e., the distance between the magnetic layer of the tape and the magnetic layer carrying the bias signal is a constant).

FIG. 8 is a diagram showing the method of applying such a bias. The platen consists of a non-magnetic substrate 70 having a surface of magnetic material with a sinusoidal carrier recorded thereon at right angles to the predetermined direction of travel of the tape. For example, 70 can be an aluminum plate to which is cemented a portion of magnetic tape bearing the desired recording and covered with a wear coating. The platen is attached to a shaft 72 which is moved vertically by a cam 73. Drive means such as an electric motor 74 are provided to rotate the cam and thus periodically move the assembly of platen and tape towards a magneto-optic device (not shown). Each rotation of cam 73 will thus frame an image corresponding to the portion of tape adjacent the magneto-optic surface. To provide proper framing, it is desirable that the core be mechanically linked to the tape drive mechanism which can be continuous (as in conventional tape recorders) or intermittent as with motion picture film. Alternatively, shaft 72 can be a solenoid activated in accordance with trigger signals recorded on the record tape.

The above assembly will transfer signals to the magneto-optic film wherever the local resultant magnetic vector from the vector addition of the local bias to the local signal fields exceeds the local coercivity of the magneto-optic film. Since the bias is varying sinusoidally, some blanking will occur depending on whether the signal field is greater or less than the coercivity of the magneto-optic surface. Moreover the direction of the resulting vector will also vary with the sinusoidal variation of the bias over an angular spread which is smaller the greater the maximum signal strength relative to the bias, and which, as with the carrier signal is full wave rectified. Where the signal is weak, or absent, the periodic bias will not give rise to any output light, because extinction is maintained for either sense of the bias field. This angular modulation over each period of the bias therefore results in an area modulation of the degree of rotation of polarized light reflected from the magneto-optic surface which is detected by passing the reflected light through an analyzer to a linear detector.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Method of retrieving analog information stored as an amplitude-modulated periodic carrier signal recorded on a magnetic recording member which comprises:

I. applying the magnetic field from the magnetic signals recorded on the recording member to a magneto-optic film;

II. simultaneously applying a time-wise constant bias field to said magneto-optic film directed in the plane of said film and at an angle to the direction of said signal field, whereby the magnetic field at each point of the magneto-optic film is alligned in accordance with the signal field strength at that point;

III. magnetizing the magneto-optic film in accordance with the field produced by the signal field and the bias field; and IV. detecting the pattern of magnetization on said magneto-optic film by detecting the change in rotation of polarized light reflected from said film whereby the carrier signal is full-wave demodulated.

2. Method of claim 1 in which said bias field is applied in a direction perpendicular to said signal field.

3. Method of claim 2 wherein said bias field has a maximum strength about 10 to 20 percent of the maximum field strength.

4. Method of claim 3 in which the magneto-optic film is anisotropic and has an anisotropy field less than the bias field, said bias field being applied along the easy axis of magnetization whereby said magneto-optic film is magnetized by the combined action of said bias field and said signal field.

5. Method of claim 3 wherein the magneto-optic film is isotropic and has a coercivity less than the maximum bias field and said bias field is supplied by a periodic pattern of magnetization on a platen having the same wavelength as the carrier signal, said platen and said recording member being maintained in fixed spatial relationship and means to move said platen and said recording member whereby said bias field and said signal field are applied transiently to said magneto-optic surface.

6. Method of claim 3 wherein said magneto-optic film is isotropic and has a coercivity greater than the resultant of the maximum signal field and the bias field, said transfer being accomplished by a collapsing rotating magnetic field having a maximum strength greater than the algebraic sum of said resultant field and the coercivity and less than the coercivity of said magnetic recording member.

7. Method of claim 6 wherein said magnetic recording member is a magnetic tape having recorded thereon a sequence of frames of information each said frame being composed of a periodic carrier signal amplitude modulated with an information signal; said magnetic recording member being moved continuously past said magneto-optic film, said film being within the magnetic field of signals recorded on said tape, said collapsing rotating magnetic field being applied periodically when each said frame is positioned at a predetermined position adjacent to said magneto-optic film.

8. Apparatus for the storage and retrieval of analog information comprising a magnetic recording member means to record a periodic carrier signal of constant amplitude on said recording member;

means to demagnetize said carrier signal in accordance with information, whereby said carrier signal is amplitude modulated with said information;

means to apply the field from said magnetic recording member to a magneto-optic film;

means to apply a time-wise constant bias field to said magneto-optic film in the plane of said magneto-optic film and directed at an angle to the field from said recording member;

means to magnetize the magneto-optic film in accordance with the magnetic field applied by said signal and said bias field; and means to detect the pattern of magnetization on said magneto-optic film.

9. Apparatus of claim 8 in which said magneto-optic film is an anisotropic film having an anisotropy field less than said bias field and the bias field is applied along the easy axis of magnetization of said magneto-optic film.

10. Apparatus of claim 8 in which said magneto-optic film is an isotropic film having a coercivity greater than the resultant of the bias field and the maximum signal field, and said means to magnetize the magneto-optic field comprises a collapsing rotating magnetic field having a maximum strength greater then the algebraic sum of said resultant and said coercivity and less than the coercivity of said magnetic recording member.

11. Apparatus of claim 8 wherein said magneto-optic film is an isotropic film having a coercivity less than the bias field; and said means to magnetize the magneto-optic film comprises a platen having a periodic pattern of magnetization of the same wavelength as said carrier signal; means to maintain said magnetic recording member and said platen at a fixed distance from each other; and means to move said platen and said magnetic recording member whereby the magneto-optic film is transiently exposed to the combined field of said magnetic recording member and said platen.

* * * * *

UNITED STATES PATENT OFFICE
CERTIFICATE OF CORRECTION

PATENT NO. : 3,736,385
DATED : May 29, 1973
INVENTOR(S) : Robert K. Waring, Jr.

It is certified that error appears in the above-identified patent and that said Letters Patent are hereby corrected as shown below:

Abstract, line 3 - insert a before magnetic;

Col. 2, line 4 - "the easy axis of preferably and is preferbly greater than" should read --the easy axis of magnetization and is preferably greater than--;

Col. 3, line 48 - replace "when" with --where--;

Col. 5, line 3 - "vertorially" should be --vectorially--;

Col. 6, line 8 - insert a comma after magnetization;
line 39 - insert a comma after direction;
line 46 - "vacuous" should be --vacuum--;

Col. 7, line 31 - "$T_i - R > H_c$" should be --$|T_i| - |R| > H_c$--;
line 40 - "$R + T = H_c$" should be --$|R| + |T| = H_c$--;

Signed and Sealed this
seventh Day of October 1975

[SEAL]

Attest:

RUTH C. MASON
*Attesting Officer*

C. MARSHALL DANN
*Commissioner of Patents and Trademarks*